(12) United States Patent
Vo et al.

(10) Patent No.: US 8,262,051 B2
(45) Date of Patent: Sep. 11, 2012

(54) Z-LEG SHOCK ISOLATOR

(75) Inventors: Peter H. Vo, Tucson, AZ (US); Edward C. Schlatter, Tucson, AZ (US); Jeffrey J. Layton, Vail, AZ (US)

(73) Assignee: Raytheon Company, Waltham, MA (US)

( * ) Notice: Subject to any disclaimer, the term of this patent is extended or adjusted under 35 U.S.C. 154(b) by 1419 days.

(21) Appl. No.: 11/895,316

(22) Filed: Aug. 23, 2007

(65) Prior Publication Data

US 2010/0327142 A1   Dec. 30, 2010

(51) Int. Cl.
*F16M 13/00*   (2006.01)

(52) U.S. Cl. ........ 248/560; 248/562; 248/566; 248/632; 248/634; 248/636; 267/136; 267/140.4; 267/144; 415/119

(58) Field of Classification Search .................. 248/621, 248/634, 560, 638, 60, 632, 636, 562, 566; 267/152, 136, 140.3, 140.13, 293, 30, 140, 267/140.5, 149, 164, 165, 158, 102, 144, 267/140.4; 188/371, 378, 377, 379, 380, 188/129; 280/124.1; 180/902; 415/119
See application file for complete search history.

(56) References Cited

U.S. PATENT DOCUMENTS

| | | | | |
|---|---|---|---|---|
| 4,905,972 A | * | 3/1990 | Scowen | 267/152 |
| 5,102,107 A | * | 4/1992 | Simon et al. | 267/152 |
| 5,197,698 A | * | 3/1993 | Bartholomew | 248/60 |
| 5,746,419 A | * | 5/1998 | McFadden et al. | 267/140 |
| 7,735,812 B2 | * | 6/2010 | Fitzgerald | 267/293 |
| 7,819,624 B2 | * | 10/2010 | Bonnet | 415/119 |
| 2002/0079627 A1 | * | 6/2002 | McCollough et al. | 267/107 |
| 2004/0041319 A1 | * | 3/2004 | Suzuki et al. | 267/153 |
| 2004/0124572 A1 | * | 7/2004 | Tamada et al. | 267/136 |
| 2007/0001355 A1 | * | 1/2007 | Maeno et al. | 267/140.13 |
| 2007/0053168 A1 | * | 3/2007 | Sayir et al. | 361/718 |

FOREIGN PATENT DOCUMENTS

WO   WO-2009029171 A1   3/2009

OTHER PUBLICATIONS

"International Application Serial No. PCT/US2008/009724, Search Report and Written Opinion mailed Jan. 30, 2009", 10 pgs.

* cited by examiner

*Primary Examiner* — Todd M Epps
(74) *Attorney, Agent, or Firm* — Schwegman Lundberg & Woessner, P.A.

(57) ABSTRACT

An isolator. The novel isolator includes a first mounting structure, a second mounting structure, and a structure for providing a coupling path between the first and second mounting structures, this path having a series of zigzag patterns adapted to attenuate shock and/or vibration energy. The first mounting structure is attached to the shock source, and the second mounting structure is attached to the device to be isolated. In an illustrative embodiment, the isolator provides a path having a series of ninety-degree bends and a length greater than a direct distance between the first and second mounting structures. The path length and number of bends is tuned to provide a desired attenuation level. The dimensions of the isolator may also be tuned to provide a desired resonant frequency. In a preferred embodiment, the isolator is made from metal or some other material having stable properties over time.

18 Claims, 2 Drawing Sheets

Z-LEG SHOCK ISOLATOR

BACKGROUND OF THE INVENTION

1. Field of the Invention

The present invention relates to shock and vibration isolators. More specifically, the present invention relates to systems and methods for isolating sensitive equipment from shock and vibration.

2. Description of the Related Art

In certain applications, it is imperative that sensitive equipment is isolated from shock and vibration forces to prevent faulty readings or damage. For example, an inertial measurement unit (IMU) of a missile typically contains fiber optic gyros, accelerometers, and other circuits that are very sensitive to launch shock and pyroshock events that can occur during flight. As a result of these high shock inputs, IMU components can break or produce erroneous bias signals, causing the missile guidance system to fail.

To avoid this problem, the shock input level must be reduced by at least an order of magnitude. A common method for attenuating shock is to use isolators. Isolators are structures typically made from an elastomeric material such as rubber, that isolate the sensitive equipment from the shock source: e.g., the structure to which the equipment is mounted, such as the missile body. In an IMU, a layer of elastomeric material is often sandwiched between the IMU and the shock source to attenuate shock inputs.

A problem with elastomerics is that their mechanical properties—such as elasticity, resiliency, and creep—change over time, causing system misalignments and uncertain effectiveness of shock isolation at the time of use. This can be a significant problem for applications such as missiles where the equipment may be stored for long periods of time—typically several years—before being used.

Hence, a need exists in the art for an improved system or method for isolating sensitive equipment from shock and vibration that is more stable over time than prior approaches.

SUMMARY OF THE INVENTION

The need in the art is addressed by the isolator of the present invention. The novel isolator includes a first mounting structure, a second mounting structure, and a structure for providing a coupling path between the first and second mounting structures, this path having a series of zigzag patterns adapted to attenuate shock and/or vibration energy. The first mounting structure is attached to the shock source, and the second mounting structure is attached to the device to be isolated. In an illustrative embodiment, the isolator provides a path having a series of ninety-degree bends and a length greater than a direct distance between the first and second mounting structures. The path length and number of bends is tuned to provide a desired attenuation level. The dimensions of the isolator may also be tuned to provide a desired resonant frequency. In a preferred embodiment, the isolator is made from metal or some other material having stable properties over time.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention teaches a novel isolator design suitable for metals and other materials that are more stable over time than elastomerics. Metals (and other materials such as composites) typically have mechanical properties that do not change over time, therefore alignments and other dynamic characteristics of a metal isolator should stay the same from the time it is built to the time of actual usage. Metal, however, is not a high damping material like rubber and other elastomerics. Simply placing a layer of metal between the sensitive equipment and the shock source typically will not provide sufficient shock attenuation. A different design approach is therefore needed for a metal isolator.

By nature, shock attenuation is proportional with its travel distance (the longer the travel distance, the smaller the shock amplitude). Shock is also attenuated if its travel path is bent from a straight line. The present invention applies these two principals to design a novel "z-leg" isolator having a series of zigzag patterns. These zigzag patterns lengthen the travel distance and also bend the shock travel paths with multiple ninety-degree angles.

Figure 1:
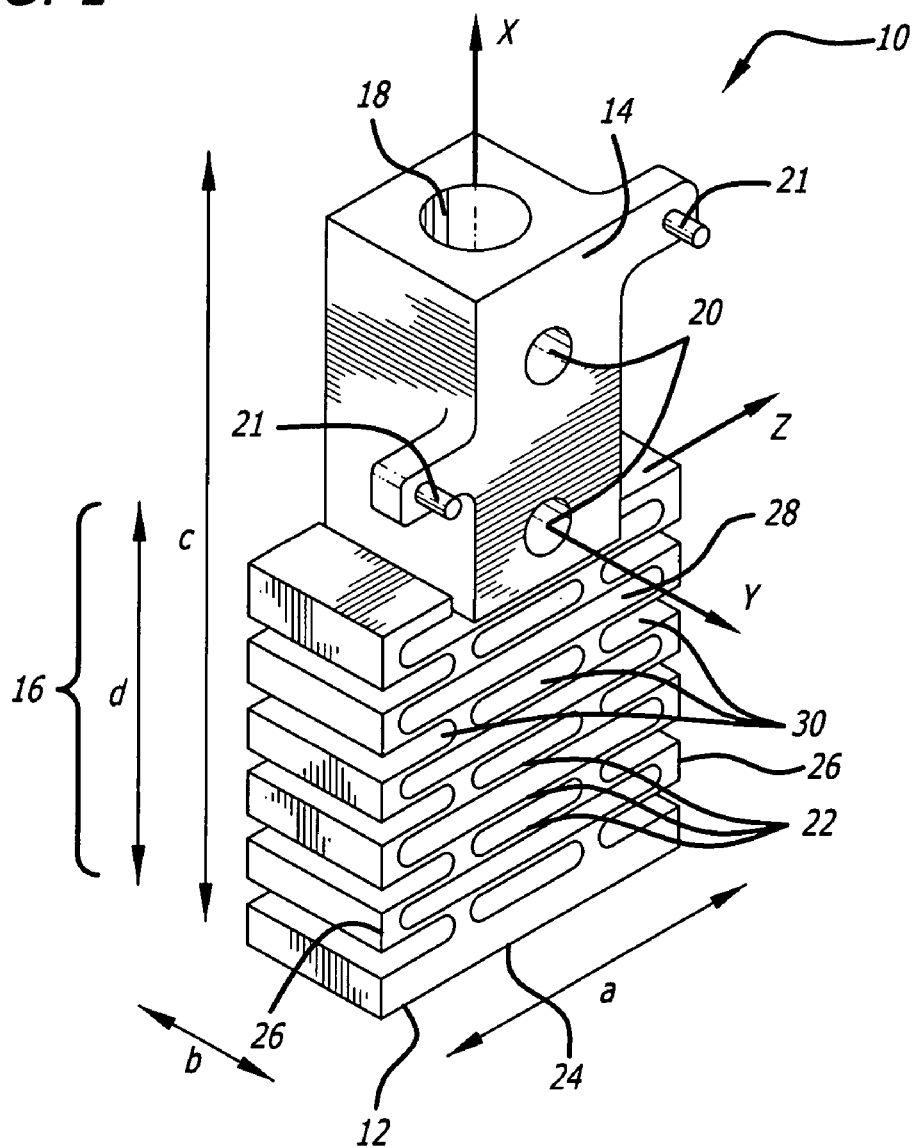
FIG. 1 is a simplified schematic of an isolator designed in accordance with an illustrative embodiment of the present invention.

FIG. 1 is a simplified schematic of a z-leg isolator 10 designed in accordance with an illustrative embodiment of the present invention. The novel isolator 10 includes a first mounting structure 12, a second mounting structure 14, and a zigzag structure 16 connecting the first mounting structure 12 and second mounting structure 14. The first mounting structure 12 is attached to the shock source (e.g., the support structure) and the second mounting structure 14 is attached to the sensitive equipment (e.g., the IMU). The sensitive equipment is thus isolated from direct contact with the support structure: any shock or vibration loads in the support structure travel through the isolator 10 (and through the zigzag structure 16) before reaching the sensitive equipment.

The zigzag structure 16 provides a path (or paths) for shock and vibration energy to travel between the first mounting structure 12 and the second mounting structure 14. In accordance with the present teachings, this path includes a series of zigzag patterns that include a plurality of ninety degree bends. Because of the zigzag patterns, the path between the first and second mounting structures 12 and 14 is much longer than the straight-line distance between them. Thus, shocks and vibrations are attenuated by the series of bends and the elongated path provided by the zigzag structure 16.

In the illustrative embodiment shown in FIG. 1, the first mounting structure 12 includes a plate 12 having dimensions a×b at the bottom web of the isolator 10 that can be bolted to the support structure (not shown). A through-hole 18 is bored through the length of the isolator 10 (along the x-axis) in the center of the device, from the upper end to the bottom mounting plate 12, to allow a bolt to be placed within, bolting the first mounting plate 12 to the support structure. After assembly, the bolt should preferably be in contact with only the bottom mounting plate 12, not the entire length of the isolator 10 (to avoid providing a shorter path between the two mounting structures 12 and 14). As shown in FIG. 1, the isolator 10 has a length c from top to bottom.

The second mounting structure 14 includes a plate 14 at the upper end of the isolator 10, perpendicular to the first mounting plate 12 (in FIG. 1, the second mounting plate 14 is parallel to the x-z plane and the first mounting plate 12 is parallel to the y-z plane). The second mounting plate 14 includes two through-holes 20 (parallel to the y-axis), which are used to bolt the isolator 10 to the sensitive equipment (not shown). The second mounting plate 14 is bolted to the sensitive equipment along the y-axis direction, while the first mounting plate 12 is bolted to the support structure along the x-axis. The second mounting structure 14 should be designed such that when it is attached to the sensitive equipment, the zigzag structure 16 is not in direct contact with the equipment. In the embodiment of FIG. 1, the isolator 10 includes two alignment pins 21 that keep the isolator 10 aligned with the sensitive equipment. Shock and vibration loads are transferred from the isolator 10 to the sensitive equipment via the bolts and the contact area connecting the second mounting plate 14 to the equipment.

The zigzag structure 16 includes a series of horizontal plates 22 parallel to the bottom mounting plate 12 (and the y-z plane), each plate having dimensions a×b. The bottom mounting plate 12 is connected to the first horizontal plate 22 by two vertical structures 24 in the middle of the plates (one structure 24 is located a distance of about ⅓ a away from an edge of the plate 12 and the second structure 24 is located a distance of about ⅔ a away from the same edge). The first horizontal plate 22 is connected to the second horizontal plate 22 by two vertical structures 26 located at the edges of the plates (one at each edge). The second plate 22 is connected to the third plate 22 by two vertical structures 24 in the middle of the plates, similar to how the bottom plate 12 was connected to the first plate 22. The third plate 22 is connected to the fourth plate 22 by two vertical structures 26 at the edges of the plates. The remaining plates 22 are connected in a similar fashion, alternating between connecting paths in the middle and at the edges. The second mounting plate 14 is connected to (resting on) the last horizontal plate 22. Thus, shock energy from the bottom mounting plate 12 is forced to travel through an elongated path containing a series of ninety-degree bends in the zigzag structure 16 before it reaches the top mounting plate 14.

The zigzag structure 16 can also be described as a rectangular block of dimensions a×b×d having a plurality of parallel horizontal slots cut out, alternating between a long slot 28 and a row of three slots 30 (one in the middle and two on either side cutting in through the edges). In the illustrative embodiment, the isolator 10 has a rectangular block shape; however, other geometries—such as a hollow circle or hollow polygons, etc.—may also be used without departing from the scope of the present teachings.

In the illustrative embodiment, the different sections of the isolator 10 (including the first mounting structure 12, the second mounting structure 14, and the zigzag structure 16) form a single piece of metal. The isolator 10 may be fabricated, for example, by using a mold or by cutting pieces (slots and through-holes) out of a solid block of metal.

In the illustrative embodiment, the isolator 10 is made from metal, but the invention is not limited thereto. Other materials such as composites may also be used without departing from the present teachings. In a preferred embodiment, the isolator 10 is made from a material such as stainless steel that is ductile and has a high fatigue strength to withstand any stress caused by flexure when the isolator 10 is subject to shock or vibration loads.

Figure 2:
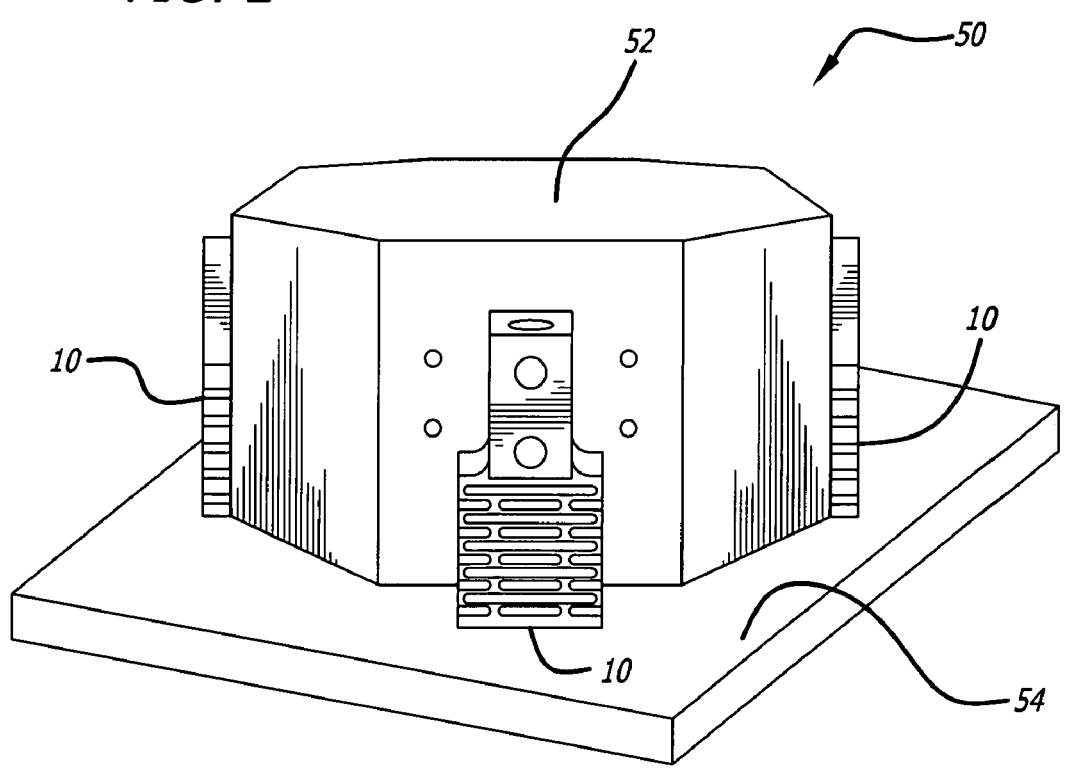
FIG. 2 is a simplified schematic of an IMU isolation system designed in accordance with an illustrative embodiment of the present invention.

FIG. 2 is a simplified schematic of an IMU isolation system 50 designed in accordance with an illustrative embodiment of the present invention. In the illustrative embodiment, an IMU 52 is isolated from shocks and vibrations using four z-leg isolators 10 (only three isolators 10 are visible in FIG. 2). Any number of isolators 10 may be used in the isolation system 50. Four isolators 10 were chosen for this application for stability and because of the shape of the IMU 52. The isolators 10 are equally spaced around the IMU 52, ninety degrees apart from each other.

The upper mounting structure 14 of each isolator 10 is bolted to the IMU 52. The lower mounting structure 12 of each isolator 10 is bolted to a support structure 54 (which could be a missile body or bulkhead). Note that the IMU 52 is not in direct contact with the support structure 54. The isolators 10 are positioned so that the IMU 52 is elevated relative to the support structure 54, such that shock energy must travel through the isolator to couple to the IMU 52. The IMU 52 is also not in direct contact with the zigzag structures 16 of the isolators 10, forcing shock energy to travel through the zigzag path before being transmitted to the IMU 52.

During a shock event, shock input from the support structure 54 starts from the isolator's bottom web 12 and travels to the upper end 14 of the isolator 10 where the IMU 52 is attached. As shock travels through the isolator's zigzag flexures, its amplitude attenuates each time shock is forced to bend ninety degrees. At the end of travel, the residual left over shock gets into the IMU 52 via the bolt joint interface between the isolator 10 and the IMU 52. By tuning the number of ninety-degree turns and the total shock travel length, a desired shock attenuation level can be attained.

In the illustrative embodiment, shock attenuation is most effective at high frequencies (about 1 kHz to 10 kHz). Shock may be amplified, however, at the resonant frequency of the overall system 50. In accordance with the present teachings, the z-leg isolators 10 may be tuned by adjusting the dimensions of the isolators so that the resonant frequency of the system 50 is at a desired frequency (such as a frequency where shocks and vibrations are less harmful to the IMU 52).

For example, the physical components of a typical IMU 52 are more sensitive to shocks at high frequencies of about 1000 Hz and above. Large shocks at these frequencies may physically damage the IMU components. The IMU output signal (data stream) is only responsive to frequencies below its bandwidth (typically about 200 Hz). The IMU output will not respond to frequencies above its bandwidth. For this illustrative application, the resonant frequency of the system 50 should therefore be moved to a frequency that is above 200 Hz and below 1000 Hz to minimize harmful effects to the IMU 52. In an illustrative embodiment, the dimensions of the z-leg isolators 10 are chosen to provide a system resonant frequency at about 400 Hz.

The amplification level at resonant frequency may be reduced by filling the slots (28 and 30) of each isolator 10 with a high damping material such as rubber or some other elastomeric. In an illustrative embodiment, the slots of each isolator 10 are filled with a silicone rubber having a hardness of 60 A shore durometer. A lower hardness rubber may provide higher damping.

Thus, the present invention has been described herein with reference to a particular embodiment for a particular application. Those having ordinary skill in the art and access to the present teachings will recognize additional modifications, applications and embodiments within the scope thereof. For example, while the invention has been described with reference to an IMU application, the novel z-leg isolator may also be used in other applications to attenuate shocks and/or vibration.

It is therefore intended by the appended claims to cover any and all such applications, modifications and embodiments within the scope of the present invention.

Accordingly,

What is claimed is:

1. An isolator comprising:
a first mounting structure;
a second mounting structure; and
a zig-zag structure connected between the first mounting structure and the second mounting structure, the zig-zag structure including:
a first plate that is joined to the first mounting structure by a first support that is orthogonal to the first plate, the first support being located somewhere along a middle section of the first plate; and
a second plate that is joined to the first plate by a second support that is located at one end of the first plate and a third support that is located at an opposing end of the first plate, the second and third supports being orthogonal to the first plate and second plates; and
wherein said zig-zag structure forms a plurality of slots between the plates, and wherein said isolator further includes a high damping material disposed within one or more of said slots.

2. The isolator of claim 1 wherein said zig-zag structure forms a path that has a length substantially greater than a direct distance between said first and second mounting structures.

3. The isolator of claim 2 wherein said length including the ninety-degree bends, the length being selected to provide a desired attenuation level.

4. The isolator of claim 1 wherein said high damping material is an elastomeric material.

5. The isolator of claim 1 wherein said first mounting structure includes a first mounting plate.

6. The isolator of claim 5 wherein said second mounting structure includes a second mounting plate.

7. The isolator of claim 6 wherein said first mounting plate is perpendicular to said second mounting plate.

8. The isolator of claim 1 wherein said first mounting structure includes one or more through-holes for bolting said first mounting structure to a support structure.

9. The isolator of claim 8 wherein said second mounting structure includes one or more through-holes for bolting said second mounting structure to a device to be isolated.

10. The isolator of claim 1 wherein dimensions of said isolator are adapted to provide a desired resonant frequency.

11. The isolator of claim 1 wherein the plates comprise metal.

12. The isolator of claim 1 wherein the plates comprise a composite material.

13. The isolator of claim 1 wherein the zig-zag structure further includes a third plate that is joined to the second plate by a fourth support that is orthogonal to the first and second plates, the fourth support being located somewhere along a middle section of the second plate.

14. The isolator of claim 13 wherein the zig-zag structure further includes a fifth support that is orthogonal to the first plate, the fifth support joining the first plate to the first mounting structure and being located somewhere along a middle section of the first plate, and wherein the zig-zag structure further includes a sixth support that is orthogonal to the second and third plates, the sixth support joining the third plate to the second plate and being located somewhere along a middle section of the second plate.

15. The isolator of claim 1 wherein the zig-zag structure further includes a fourth support that is orthogonal to the first plate, the fourth support joining the first plate to the first mounting structure and being located somewhere along a middle section of the first plate.

16. An apparatus for isolating a device from a support structure comprising:
a first mounting structure adapted to be attached to said support structure;
a second mounting structure adapted to be attached to said device; and
a zig-zag structure connected between the first mounting structure and the second mounting structure, the zig-zag structure including:
a first plate that is joined to the first mounting structure by a first support that is located at one end of the first plate and a second support that is located at an opposing end of the first plate, the first and second supports being orthogonal to the first plate; and
a second plate that is joined to the first plate by a third support that is orthogonal to the first plate, the third support being located somewhere along a middle section of the second plate; and
wherein said zig-zag structure forms a plurality of slots between the plates, and wherein said isolator further includes a high damping material disposed within one or more of said slots.

17. A system comprising:
a support structure;
a device being isolated; and
a plurality of isolators, each isolator including:
a first mounting structure attached to said support structure;
a second mounting structure attached to said device; and
a zig-zag structure connected between the first mounting structure and the second mounting structure, the zig-zag structure including:
a first plate that is joined to the first mounting structure by a first support that is orthogonal to the first plate, the first support being located somewhere along a middle section of the first mounting structure; and
a second plate that is joined to the first plate by a second support that is located at one end of the first plate and a third support that is located at an opposing end of the first plate, the second and third supports being orthogonal to the first plate and second plates; and
wherein said zig-zag structure forms a plurality of slots between the plates, and wherein said isolator further includes a high damping material disposed within one or more of said slots.

18. A method for isolating a device from a support structure including the steps of:
attaching a first mounting structure of an isolator to said support structure; and
attaching a second mounting structure of said isolator to said device, wherein the isolator further includes a zig-zag structure connected between the first mounting structure and the second mounting structure, the zig-zag structure including:
a first plate that is joined to the first mounting structure by a first support that is located at one end of the first plate and a second support that is located at an opposing end of the first plate, the first and second supports being orthogonal to the first plate; and
a second plate that is joined to the first plate by a third support that is orthogonal to the first plate, the third support being located somewhere along a middle section of the second plate; and
wherein said zig-zag structure forms a plurality of slots between the plates, and wherein said isolator further includes a high damping material disposed within one or more of said slots.

* * * * *